(12) United States Patent
Terauchi

(10) Patent No.: US 9,491,350 B2
(45) Date of Patent: Nov. 8, 2016

(54) AUTOFOCUS DEVICE AND DIGITAL CAMERA

(71) Applicant: RICOH IMAGING COMPANY, LTD., Tokyo (JP)

(72) Inventor: Masakazu Terauchi, Tochigi (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/748,486

(22) Filed: Jun. 24, 2015

(65) Prior Publication Data

US 2015/0296130 A1    Oct. 15, 2015

Related U.S. Application Data

(63) Continuation of application No. 13/922,510, filed on Jun. 20, 2013, now Pat. No. 9,106,823.

(30) Foreign Application Priority Data

Jun. 21, 2012  (JP) .................................. 2012-140051

(51) Int. Cl.
H04N 5/232    (2006.01)
G02B 7/09     (2006.01)
G02B 7/38     (2006.01)

(52) U.S. Cl.
CPC ............ *H04N 5/23212* (2013.01); *G02B 7/09* (2013.01); *G02B 7/38* (2013.01)

(58) Field of Classification Search
CPC ....... H04N 5/23212; G02B 7/38; G02B 7/09
USPC ........................................................ 348/353
See application file for complete search history.

(56) References Cited

U.S. PATENT DOCUMENTS

| | | | |
|---|---|---|---|
| 6,282,379 | B1 | 8/2001 | Ide et al. |
| 7,664,385 | B2 | 2/2010 | Shinohara |
| 7,932,951 | B2 | 4/2011 | Toguchi |
| 2005/0012846 | A1 | 1/2005 | Shinohara |
| 2008/0165273 | A1* | 7/2008 | Toguchi ............. H04N 5/23212 348/349 |
| 2011/0001871 | A1* | 1/2011 | Shintani ............... H04N 5/2253 348/360 |

FOREIGN PATENT DOCUMENTS

| | | |
|---|---|---|
| JP | 05-297437 | 11/1993 |
| JP | 2006-119456 | 5/2006 |
| JP | 2008-083455 | 4/2008 |
| JP | 2008-165141 | 7/2008 |
| JP | 2011-145313 | 7/2011 |

OTHER PUBLICATIONS

Office Action issued in Japan Counterpart Patent Appl. No. 2012-140051, dated Mar. 8, 2016, along with an English translation thereof.

* cited by examiner

*Primary Examiner* — Gevell Selby
(74) *Attorney, Agent, or Firm* — Greenblum & Bernstein P.L.C.

(57) ABSTRACT

An autofocus device comprising includes a lens drive system for translating a lens, a first in-focus position detector for detecting a first in-focus position while translating the lens in a first direction by the lens drive system and a second in-focus position detector for detecting a second in-focus position while translating the lens in a direction opposite with respect to the first direction by the lens drive system, the second in-focus position detector operating after the first in-focus position is detected. A backlash detector detects a backlash in the lens drive system according to the first and the second in-focus positions.

20 Claims, 6 Drawing Sheets

AUTOFOCUS DEVICE AND DIGITAL CAMERA

CROSS-REFERENCE RELATED APPLICATIONS

The present application is a continuation of U.S. application Ser. No. 13/922,510 filed Jun. 20, 2013, the disclosure of which is incorporated herein by reference in its entirety.

BACKGROUND OF THE INVENTION

1. Field of the Invention

The present invention relates to a lens drive system applied in an autofocus operation, and more particularly, to a lens drive system of a camera that uses a contrast-detection autofocus process.

2. Description of the Related Art

In the contrast-detection autofocus operation, a lens position where the contrast of an image appears to be the maximum value (a peak position) is discovered by translating the lens. In order to detect a peak position, it is necessary for the lens to pass once over the peak position, which corresponds to the in-focus position. Namely, when the peak position is detected, it is necessary to move the lens back to the peak position to adjust the lens system to the in-focus condition. However, every lens drive system includes backlash and the exact size of the backlash is normally unknown. Therefore, when the peak position is detected, the lens is moved back a distance that is greater than a distance sufficient to counterbalance the exceeded travel and the backlash. In turn, the lens is again translated forward, as in the searching operation, until an image having the contrast equal to the above-detected peak value is obtained. Thereby, the lens system is positioned in an in-focus position.

In consideration of the variation of backlash among lenses, camera bodies, and lens types, Japanese Unexamined Patent Publication No. H05-297437, which relates to a phase-difference detection method, discloses a camera system where backlash data is stored in a memory inside a lens barrel to calibrate the lens drive and to achieve a precise distance measurement.

SUMMARY OF THE INVENTION

However, the same type of products can have a different amount of backlash, which also varies with respect to how the lenses and the cameras are used, and also with degradation over time. Therefore, storing the size of the backlash in the memory of a lens barrel or camera body, as in Japanese Unexamined Patent Publication No. H05-297437, and applying this data in determining a distance to move back the lens in a contrast-detection autofocus operation, the lens may not be translated to the in-focus position directly from the exceeding position with sufficient accuracy. Therefore, the lens may be moved back an extra distance, as in the prior art, and retranslated to the peak position upon detecting the contrast of images.

Therefore, one aspect of the present invention is to provide a system that is able to determine the precise backlash of an individual lens drive system.

According to the present invention, an autofocus device and/or a digital camera are provided that includes a lens drive system, an imager, a contrast detector, first and second peak detectors, and a backlash detector.

The lens drive system translates a lens. The imager captures an image through the lens. The contrast detector detects the contrast of an image captured by the imager. The first peak detector detects a first contrast peak of images captured at different lens positions as the lens is translated in a forward direction. The second peak detector detects a second contrast peak of images captured at different lens positions as the lens is translated in a backward direction. The detection of the second peak is carried out after detection of the first contrast peak. The backlash detector detects the backlash in the lens drive system according to the positions of the first and second contrast peaks.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
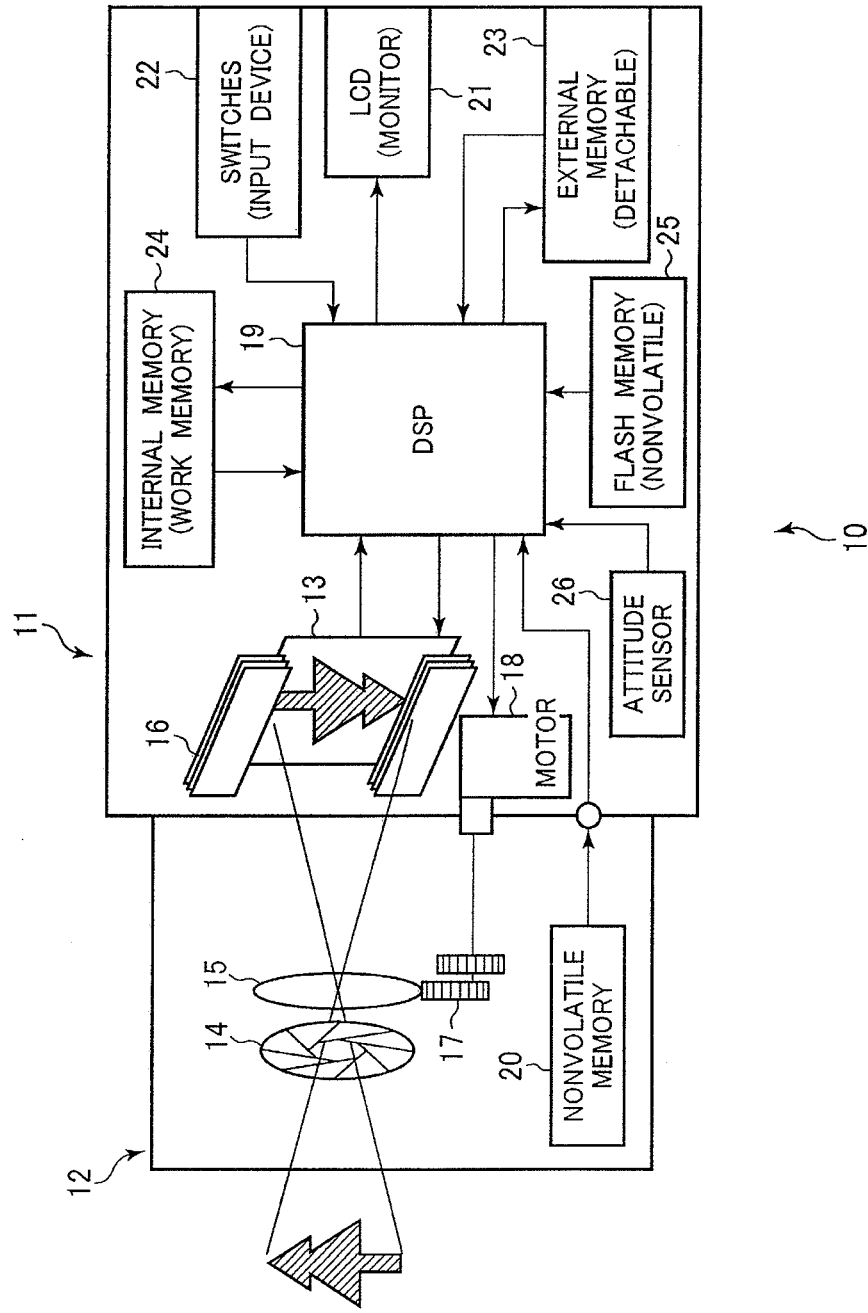
FIG. 1 is a block diagram of the structure of a digital camera provided with an autofocus device of an embodiment of the invention.

The present invention is described below with references to the embodiments shown in the drawings.

FIG. 1 is a block diagram schematically illustrating the general structure of an interchangeable-lens digital camera to which an autofocus device of an embodiment of the present invention is applied.

As for the interchangeable-lens digital camera 10, a detachable lens barrel 12 is attached to a camera body 11. An object image is projected on an image sensor inside the camera body 11 through an aperture 14 of the lens system 15 inside the lens barrel 12. A mechanical shutter 16 may also be provided in front of the image sensor 13 inside the camera body 11.

The lens system 15 is connected to a lens drive train 17, which may be a combination of gears, and the lens drive train 17 is connected to a motor 18 inside the camera body. Namely, the position of the lens system 15 is shifted by drive power of the motor 18 transmitted via the lens drive train 17. Note that the operation of the motor 18 may be controlled by a signal processer 19, such as a DSP.

Further, a CPU (not shown) and a nonvolatile memory 20 may be provided inside the lens barrel 12 and they may be connected to the signal processor 19 of the camera body 11 through a connector. Inside the camera body 11, the signal processor 19 may be further connected to a monitor 21, such as an LCD, operating switches 22, a detachable external memory 23, such as a memory card for storing captured images, a nonvolatile flash memory 25, and an attitude sensor 26, such as a detector that detects the inclination or attitude of the camera body 11.

Figure 2:
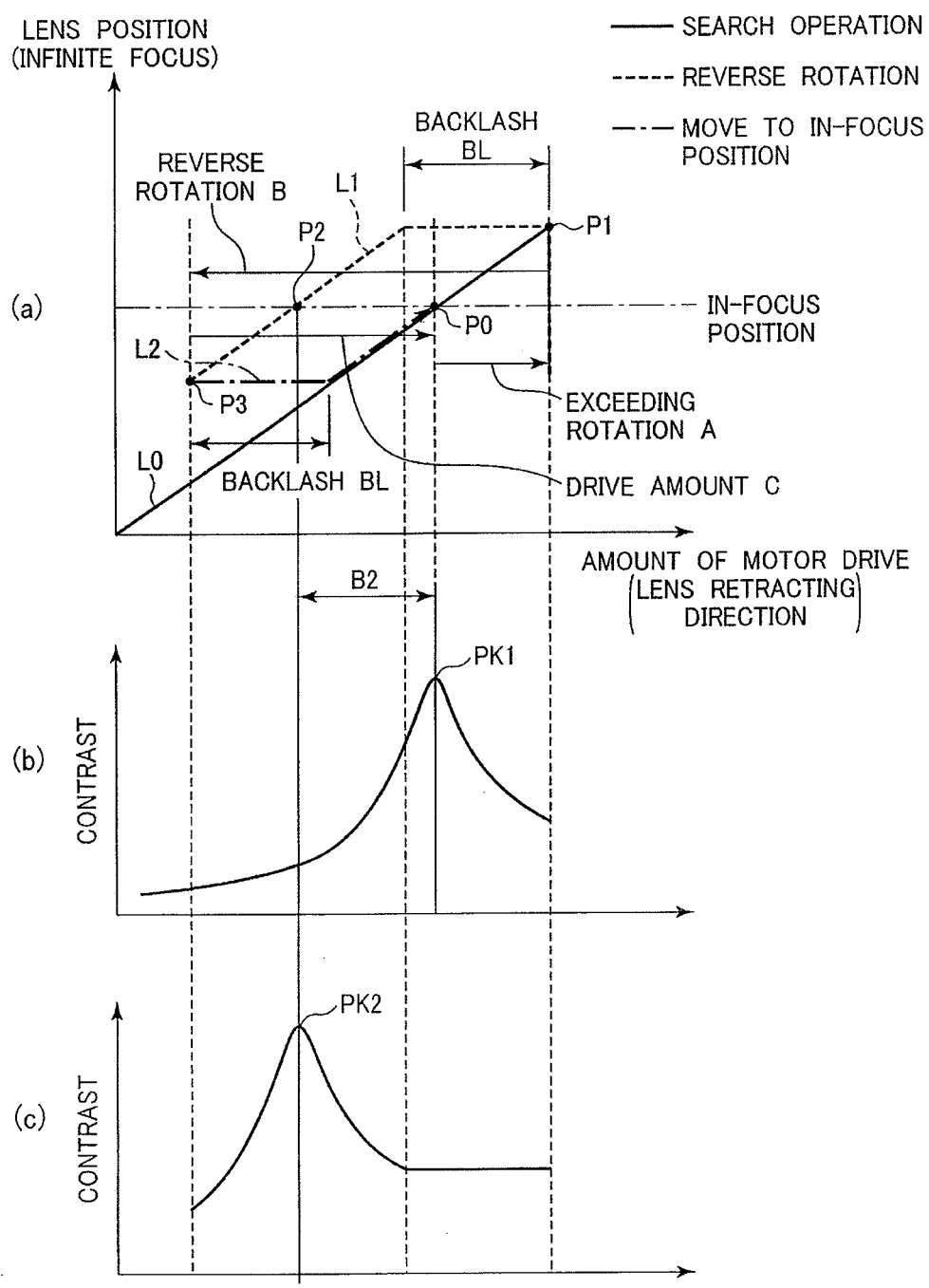
FIG. 2 shows a set of diagrams representing the relationship between the motor drive and the lens position, and contrast variations between forward and backward drive.
Figure 3:
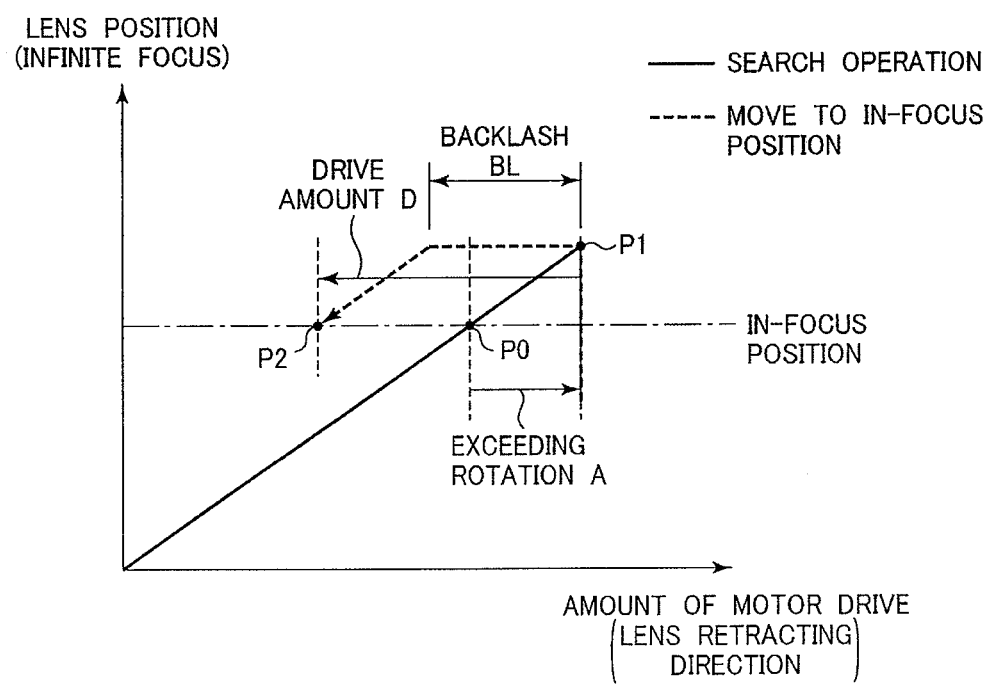
FIG. 3 is a graph illustrating the relationship between the motor drive and the lens position in an autofocus operation using a detected backlash.

With reference to FIGS. 1-3, a contrast-detection autofocus operation of the present embodiment is explained. In the present embodiment, the amount of backlash in the drive system including the drive train 17 and the motor 18 for moving the lens system is detected by a method explained with reference to FIG. 2. When the amount of backlash is detected, the lens system 15 may be driven as described in FIG. 3. Note that the autofocus operation may be activated when a release button included in the switch group 22 is depressed halfway.

FIG. 2(*a*) is a graph representing the relationship between the rotation of the motor 18 (abscissa) and the lens position (ordinate) when detecting the backlash. In FIG. 2, the direction toward the right side along the horizontal axis corresponds to a lens retracting direction and the direction toward the upper side along the vertical axis corresponds to the direction toward the infinity focus.

In the autofocus operation, when the backlash-detection operation starts the motor 18 is rotated in a predetermined direction at a predetermined step or angle (hereinafter, this rotational direction is referred to as a forward direction). For example, the lens system 15 is moved from the maximum extracted position to the retracted position, which is represented by a solid line L0. During the above translation of the lens, an image is captured at every step and the contrast of each image is calculated. FIG. 2(*b*) shows an example of the contrast variations in this operation.

As illustrated in FIGS. 2(*a*) and 2(*b*), the peak (a first contrast peak) PK1 of the contrast appears at the in-focus position P0. However, in order to detect the peak PK1, one needs to detect a drop or decrease in the contrast. Consequently, when the peak PK1 is detected, the position of the lens is in a position P1 and the peak PK1 has already been passed through. Therefore, in order to obtain an appropriate in-focus image, the lens should be moved back to the position P0 to offset an exceeding rotation A.

However, if the exact amount of the backlash BL is indefinite, the amount of reverse rotation for the motor 18 to drive is unknown. Therefore, in the conventional autofocus operation, the amount of the reverse rotation B is preset to include a marginal or extra rotation to ensure that the reverse rotation value is sufficiently greater than the total rotations for a predicted normal backlash and a predicted normal exceeding rotation. In other words, the reverse rotation B=A+BL+α, where α is an extra rotation. Namely, when the contrast peak is detected, the motor 18 is rotated in the backward direction by the amount of reverse rotation B, so that the lens is moved back to a restore position P3 from the position P1. After that, the motor 18 is once more rotated in the forward direction to set the lens in the in-focus position P0, such that the motor 18 is rotated for a value C (=BL+α) that corresponds to the reverse rotation B minus the exceeding rotation A by comparing the current contrast with the contrast obtained at the position P0. Incidentally, the amount of the reverse rotation B may be stored in the nonvolatile memory 20 inside the lens barrel 12 or in the flash memory 25 inside the camera body 11.

On the other hand, in the present embodiment, the backlash is detected in each backlash-detection operation. Namely, during the reverse rotation of the motor 18 (broken line L1), the backlash is determined according to the following principle.

In the present embodiment, an image is captured in every step of the reverse rotation drive (broken line L1) and the contrast of each image is calculated to detect the peak contrast in the reverse rotation drive. FIG. 2(*c*) shows the variation of the contrast during the reverse rotation drive as an example. As illustrated in FIGS. 2(*a*) and 2(*b*), when the lens is driven in the backward direction for the reverse rotation B, the lens passes an in-focus position P2, where a contrast peak (a second peak) PK2 appears. Namely, the backlash-detection operation obtains the size of the backlash BL from a gap (angle) of the motor drive that appears between the contrast peaks PK1 and PK2, which are detected during rotations of the motor 18 in the forward direction and in the backward direction, respectively.

Further, in the autofocus operation, when the lens is moved back by the reverse rotation B, the motor 18 is once more rotated in the forward direction (driven in the retracting direction) for the drive amount C (=BL+α), which corresponds to the reverse rotation B minus the exceeding rotation A, so that the lens position is adjusted to the in-focus position P0 (dash line L2).

The amount of backlash BL, which is detected, is stored in the nonvolatile memory 20 inside the lens barrel 12 or the flash memory 25 inside the camera body 11. A drive amount D of the motor 18 for adjusting the lens position from the exceeding position P1 to the in-focus position P0 is then calculated as the sum of the exceeding rotation A and the amount of the backlash BL.

Figure 4:
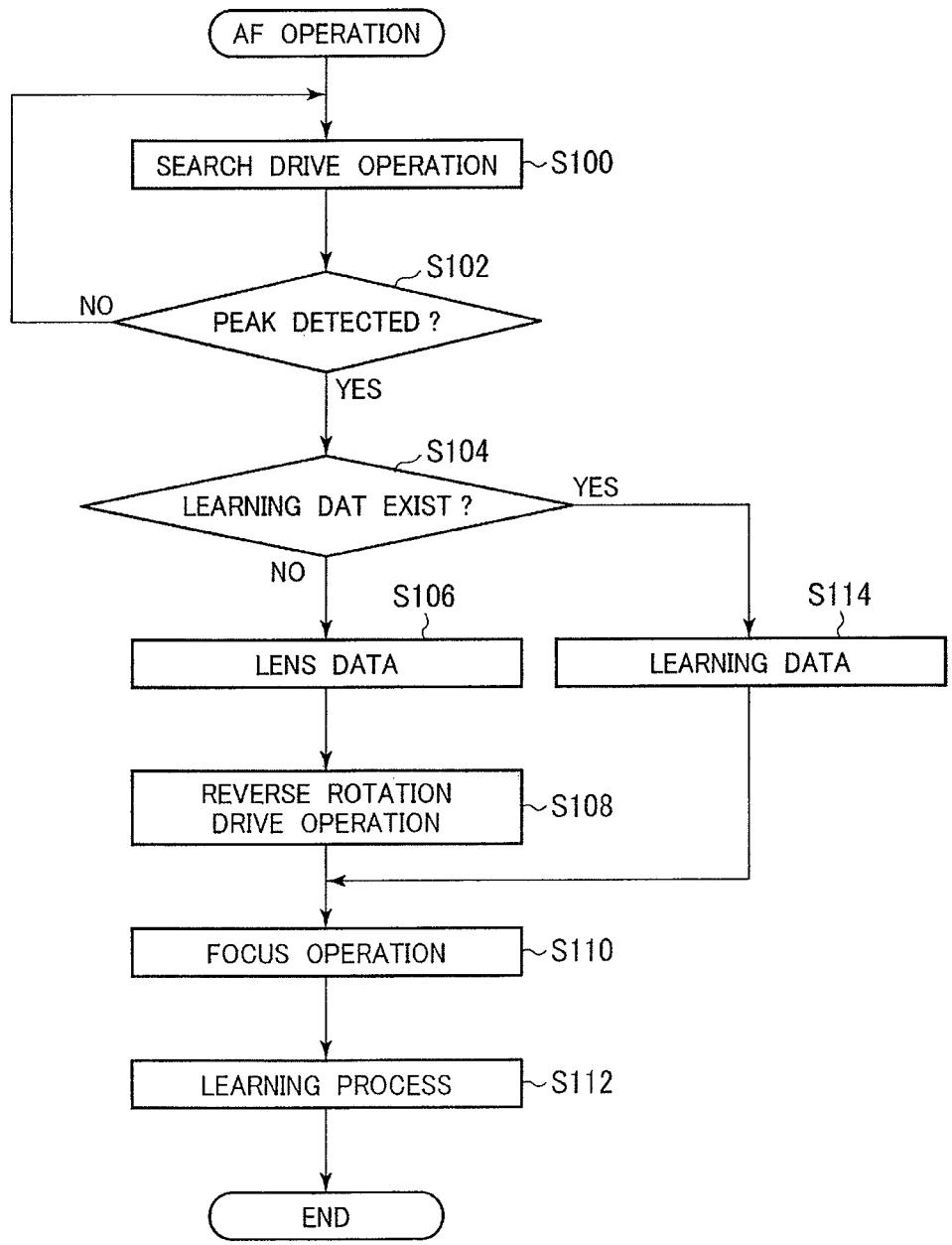
FIG. 4 is a flowchart of the autofocus operation of the present embodiment.

With reference to FIG. 1 and the flowcharts of FIGS. 4 and 5, the overall flow of the autofocus operation of the present embodiment will be explained. Note that the present autofocus operation may include a learning function. Further, the operation is carried out mainly by the signal processer 19 and internal memory 24.

When the autofocus operation is started, a search drive operation is carried out in Step S100. If it is the first time to carry out the search drive operation, an initial operation is carried out, such that the lens position is moved to the maximum extended position, then an image is captured and the contrast of the captured image is calculated. Note that the search drive operation may start from the present position instead of moving the lens to the maximum extended position or a predetermined initial position. The motor 18 is then rotated by one step in the retracting direction in the search drive and an image is captured and the contrast of the captured image is calculated. This operation is repeated until the peak PK1 of the contrast is detected in Step S102, in other words until the lens reaches the exceeding position P1. Namely, in the operation of Step S100 after the initial operation has been completed, the motor 18 is rotated by one step and the contrast of a predetermined area of a captured image is calculated after the image is captured. In Step S102, whether the contrast peak PK1 is detected or not is determined on the basis of changes in the contrast. If the peak has not been detected, the procedure returns to Step S100 and the same processes are repeated.

When it is determined in Step S102 that the contrast peak PK1 has been detected, whether or not learning data exists that corresponds to the present status is determined in Step S104. Note that parameters for representing the present status may include a lens identification number (type) of the lens barrel 12, a motor drive direction and speed of the motor 18, and a position or an attitude of the camera body 11 and the like. Further, the drive amount D (or the amount of backlash BL) is a value that may be subjected to a learning process. When the learning data for the current status exists, the learning data is referred to in Step S114 and the drive amount D that corresponds to the current status, for example, may be retrieved from the nonvolatile memory 20 of the lens barrel 12 or the flash memory 25 of the camera body 11, and in turn Step S110 is carried out.

On the other hand, when it is determined that the learning data corresponding to the present status does not exist, a default backlash BL, which may be stored in the nonvolatile memory 20 of the lens barrel 12 or the flash memory 25 of the camera body 11, is retrieved in Step S106 and the reverse rotation drive is carried out in Step S108.

Figure 5:
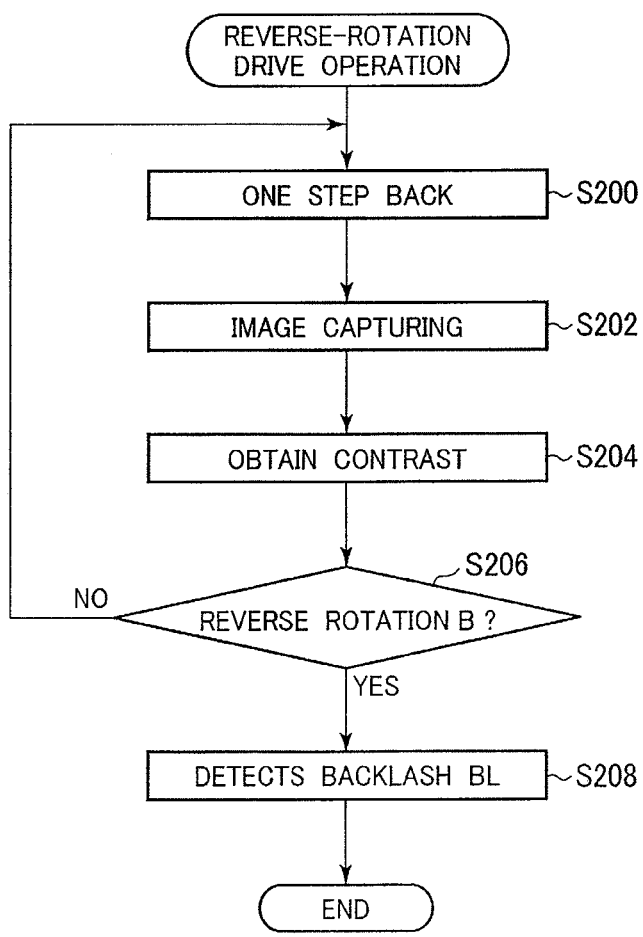
FIG. 5 is a flowchart of a reversal-rotation drive operation.
Figure 6:
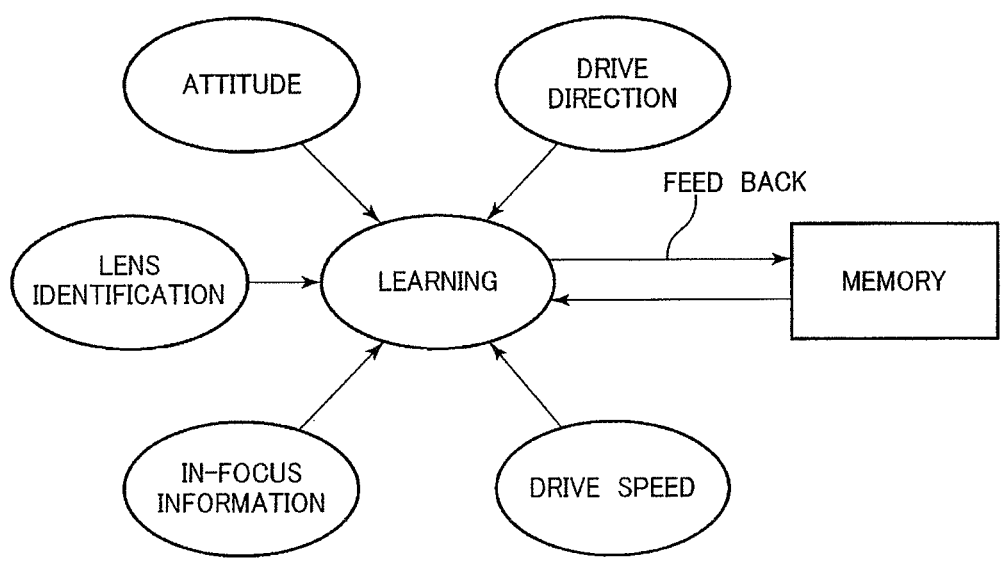
FIG. 6 schematically illustrates a concept of a learning process of the present embodiment.

A flowchart of the reverse-rotation drive operation of Step S108 is shown in FIG. 5. In the reverse-rotation drive operation of Step S108, the motor 18 is rotated one step in the backward direction (the direction extending the lens) at Step S200 and an image is captured in Step S202. The contrast of a predetermined area of the captured image is then calculated in Step S204 and the calculated contrast value may be stored in the internal memory 24 in turn. In Step S206, whether the amount of the reverse rotation of the motor 18 has reached the reverse rotation B is determined. When it is determined that the reverse rotation has not reached the reverse rotation B, the process returns to Step S200 and the same processes are repeated so that the position of the lens is moved along the broken line L1. On the other hand, when it is determined that the reverse rotation has reached the amount of the reverse rotation B, the process proceeds to Step S208 and the peak PK2 is detected. Further, the amount of backlash when the motor 18 is rotated in the backward direction is detected from the difference between the rotational angles at the peaks PK1 and PK2. Thereby, the reverse-rotation drive operation ends.

When the reverse-rotation drive operation of Step S108 ends, a focusing operation is carried out in Step S110 so that the lens is moved to an in-focus position P0 on the basis of the drive amount C. Namely, when it is determined in Step S104 that the learning data corresponding to the present status does not exist, immediately after the completion of the reverse-rotation drive operation of Step S108 the lens is positioned at the restore position P3 so that the motor 18 is rotated in the forward direction on the basis of the drive amount C, which is calculated in Step S108 and thereby the lens is moved to the in-focus position P0.

On the other hand, when it is determined in Step S104 that the learning data corresponding to the present status exists, the lens is positioned at an exceeding position P1 of FIG. 3 so that the motor 18 is rotated in the backward direction on the basis of the drive amount D retrieved at Step S114, and thereby the lens is moved to the in-focus position P0. Further, with reference to the result of the focusing operation, a learning process is carried out in Step S112 on the integral basis of an inclination or an attitude of the camera body, a direction of the motor drive, an identification number of the lens barrel, or in-focus information and speed of the motor, for example. The result of the learning process is stored in the nonvolatile memory 20 of the lens barrel 12 and/or the flash memory of the camera body 11.

For example, even when the lens is directly moved to the in-focus position P0 according to the drive amount D retrieved at Step S114, the present embodiment verifies whether or not the position after the lens shift appropriately corresponds to a contrast peak, such that whether the lens is in an in-focus condition, by capturing an image at the position where the lens has been moved and comparing the contrast value of the captured image with the contrast peak detected in the search drive operation. If the difference between the value of the contrast obtained at the position after the lens shift by the drive amount D and the peak value detected in the search drive operation is not within a predetermined value, it is determined that the lens has not reached an appropriate destination. When this occurs, the reverse-rotation drive operation, which is normally carried out to cancel an exceeding rotation, is carried out to find the correct peak position. Further, the coincidence of the in-focus positions P0 and P2 may be measured on the basis of whether or not the difference between a peak value of the contrast detected in this reverse-rotation drive operation and the peak value detected in the search drive operation is greater than a predetermined value. If the coincidence is significant, the backlash detected in such operation is subjected to the learning process and otherwise neglected. Note that in the present embodiment, the above-mentioned in-focus information may refer to information pertaining to the in-focus conditions with reference to a contrast difference or information pertaining to the in-focus position. Further, the present autofocus operation ends when the learning process of Step S112 is completed.

As described above, according to the present embodiment, since an amount of backlash is detected for each product, the lens can be directly and precisely moved back to the in-focus position from an exceeding position based on the detected backlash. By doing so, after the amount of the backlash is detected both the amount of time and energy consumed can be reduced compared to operations described in prior art that move the lens back to the restore position from the exceeding position and then once more move the lens to the in-focus position. Further, the load applied to the drive system is also reduced.

Further, since the amount of a reverse rotation or a backlash is learned or renewed, the lens can always be moved back appropriately from the exceeding position and an appropriate and detailed control adjusted for various status levels can be applied.

In the present embodiment, the forward direction in the search operation is defined as a direction in which the lens is moved from the most extended position to the most retracted position; however, the search operation can be operated in the opposite direction. Further, although the present embodiment is explained for a case where the lens is driven by a motor provided inside a camera body, the motor may be provided on the lens barrel side. Furthermore, the present backlash-detection operation and a method for translating a lens directly to its destination may also be applied to other types of drive systems having a backlash, such as a focusing mechanism using a phase-difference detection method and the like.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2012-140051 (filed on Jun. 21, 2012), which is expressly incorporated herein, by reference, in its entirety.

The invention claimed is:

1. An autofocus device comprising:
a lens drive system for translating a lens;
a first in-focus position detector for detecting a first in-focus position while translating the lens in a first direction by the lens drive system;
a second in-focus position detector for detecting a second in-focus position while translating the lens in a direction opposite to the first direction by the lens drive system, the second in-focus position detector operating after the first in-focus position is detected; and
a backlash detector for detecting a backlash in the lens drive system according to the first and the second in-focus positions;
wherein an amount of lens translation to an in-focus position is corrected according to previously detected backlash.

2. The autofocus device according to claim 1, further comprising:
an imager for capturing an image through the lens; and
a contrast detector for detecting a contrast of an image captured by the imager;
wherein the first and second in-focus position detectors capture images at different positions of the lens as the lens is translated and the contrast detector detects contrasts of the images, so that a peak of the contrasts detected by the first in-focus position detector corresponds to the first in-focus position and a peak of the contrasts detected by the second in-focus position detector corresponds to the second in-focus position.

3. The autofocus device according to claim 1, wherein detecting of backlash, by said backlash detector, and a learning process are performed during an autofocus operation.

4. The autofocus device according to claim 3, wherein the learning process is carried out in consideration of at least one of a lens type, a drive direction, a drive speed and an attitude of a camera body.

5. The autofocus device according to claim 1, wherein a drive amount of the lens drive system for adjusting a position of the lens from the exceeding position to the in-focus position is determined based upon an exceeding rotation and an amount of the backlash, the exceeding position being a position at which the first in-focus position is detected when the lens is translated in the first direction.

6. An autofocus device comprising:
a lens drive system for translating a lens;
a first in-focus position detector for detecting a first in-focus position while translating the lens in a first direction by the lens drive system;
a second in-focus position detector for detecting a second in-focus position while translating the lens in a direction opposite to the first direction by the lens drive system, the second in-focus position detector operating after the first in-focus position is detected; and
a backlash detector for detecting a backlash in the lens drive system according to the first and the second in-focus positions,
wherein at least one of the backlash and a drive amount from an exceeding position to the in-focus position is subjected to a learning process, the exceeding position being a position at which the first in-focus position is detected when the lens is translated in the first direction.

7. The autofocus device according to claim 6, wherein the learning process is carried out in consideration of at least one of a lens type, a drive direction, a drive speed and an attitude of a camera body.

8. The autofocus device according to claim 6, wherein detecting of backlash, by said backlash detector, and a learning process are performed during an autofocus operation.

9. The autofocus device according to claim 6, wherein a drive amount of the lens drive system for adjusting a position of the lens from the exceeding position to the in-focus position is determined based upon an exceeding rotation and an amount of the backlash.

10. An autofocus device comprising:
a lens drive system for translating a lens;
a first in-focus position detector for detecting a first in-focus position while translating the lens in a first direction by the lens drive system;
a second in-focus position detector for detecting a second in-focus position while translating the lens in a direction opposite to the first direction by the lens drive system, the second in-focus position detector operating after the first in-focus position is detected; and
a backlash detector for detecting a backlash in the lens drive system according to the first and the second in-focus positions,
wherein the first and second in-focus position detectors comprise a focusing mechanism using a phase-difference detection method.

11. The autofocus device according to claim 10, wherein detecting of backlash, by said backlash detector, and a learning process are performed during the autofocus operation.

12. The autofocus device according to claim 11, wherein the learning process is carried out in consideration of at least one of a lens type, a drive direction, a drive speed and an attitude of a camera body.

13. The autofocus device according to claim 10, wherein a drive amount of the lens drive system for adjusting a position of the lens from the exceeding position to the in-focus position is determined based upon an exceeding rotation and an amount of the backlash, the exceeding position being a position at which the first in-focus position is detected when the lens is translated in the first direction.

14. A digital camera comprising:
a lens barrel including a lens system
a lens drive system for translating a lens of the lens system;
a first in-focus position detector for detecting a first in-focus position while translating the lens in a first direction by the lens drive system;
a second in-focus position detector for detecting a second in-focus position while translating the lens in an opposite direction with respect to the first direction by the lens drive system, the second in-focus position detector operating after the first in-focus position is detected; and
a backlash detector for detecting a backlash in the lens drive system according to the first and the second in-focus positions
wherein an amount of lens translation to an in-focus position is corrected according to previously detected backlash.

15. The digital camera according to claim 14, wherein detecting of backlash, by said backlash detector, and a learning process are performed during the autofocus operation.

16. The digital camera according to claim 15, wherein the learning process is carried out in consideration of at least one of a lens type, a drive direction, a drive speed and an attitude of a camera body.

17. The digital camera according to claim 14, wherein a drive amount of the lens drive system for adjusting a position of the lens from the exceeding position to the in-focus position is determined based upon an exceeding rotation and an amount of the backlash, the exceeding position being a position at which the first in-focus position is detected when the lens is translated in the first direction.

18. A method comprising:
translating a lens;
detecting a first in-focus position while translating the lens in a first direction by a lens drive system;
detecting a second in-focus position while translating the lens in a direction opposite to the first direction by the lens drive system, the second in-focus position detecting operating after the first in-focus position is detected; and detecting a backlash in the lens drive system according to the first and the second in-focus positions wherein an amount of lens translation to an in-focus position is corrected according to previously detected backlash.

19. The method according to claim 18, wherein the detecting of backlash and a learning process are performed during an autofocus operation.

20. The method according to claim 18, wherein a drive amount of the lens drive system for adjusting a position of the lens from an exceeding position to the in-focus position is determined based upon an exceeding rotation and an amount of the backlash, the exceeding position being a position at which the first in-focus position is detected when the lens is translated in the first direction.

* * * * *